(12) United States Patent
Lin et al.

(10) Patent No.: US 10,579,765 B2
(45) Date of Patent: Mar. 3, 2020

(54) CHIP AND POWER PLANNING METHOD

(71) Applicants: NCKU Research and Development Foundation, Tainan (TW); Himax Technologies Limited, Tainan (TW)

(72) Inventors: Jai-Ming Lin, Tainan (TW); Jhih-Sheng Syu, Tainan (TW); Bo-Yuan Huang, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 6 days.

(21) Appl. No.: 16/046,684

(22) Filed: Jul. 26, 2018

(65) Prior Publication Data
US 2020/0034506 A1    Jan. 30, 2020

(51) Int. Cl.
*G06F 17/50* (2006.01)

(52) U.S. Cl.
CPC ...... *G06F 17/5072* (2013.01); *G06F 17/5077* (2013.01); *G06F 2217/78* (2013.01)

(58) Field of Classification Search
USPC ............... 320/120, 124, 125, 127, 133, 131; 716/120, 124, 125, 127, 133, 131
See application file for complete search history.

(56) References Cited

U.S. PATENT DOCUMENTS

2006/0239102 A1* 10/2006 Saita .................. H01L 23/5286
                                                              365/226

\* cited by examiner

*Primary Examiner* — Brian Ngo
(74) *Attorney, Agent, or Firm* — Donald E. Stout; Stout, Uxa & Buyan, LLP (57) ABSTRACT

A chip includes a substrate; macros placed on the substrate, which has a placement region being divided into sub-regions according to locations of the macros; and one or more vertical power stripes (VPSs) disposed in each sub-region. At least one VPS is not aligned with the VPSs of an adjacent higher or lower sub-region.

8 Claims, 6 Drawing Sheets

CHIP AND POWER PLANNING METHOD

BACKGROUND OF THE INVENTION

1. Field of the Invention

The present invention generally relates to power planning, and more particularly to a routability-driven macro-aware power planning method and chip.

2. Description of Related Art

Power planning has become a very important step in the physical design of an integrated circuit (IC). Due to shrinking of a feature size, a unit area in a chip contains more and more electronic components, which make power density in a chip increase dramatically. As performance of a design continuously improves, a modern chip consumes larger dynamic power, which makes voltage drop a serious problem. The problem becomes even more tough when lower supply voltages are used to reduce dynamic power of ICs because a tolerable voltage drop value is further shrunk.

In order to provide stable and stronger power to devices, power is usually delivered through a global power mesh before it can reach macros or standard cells. A power mesh, which consists of a power ring, horizontal power stripes (HPSs) and vertical power stripes (VPSs), is usually allocated over the top two metal layers. For example, the top metal layer is fully occupied by HPSs since the metal width in this layer is wider than other layers. The VPSs are allocated in the next metal layer. Unlike HPSs in the top layer, the routing resource in this layer is shared by signal nets. There exists a trade-off between voltage drop and routing area (or congestion) of a power network.

As advance of manufacturing technology, a modern system-on-a-chip (SoC) may contain hundreds of intellectual property (IP) macros such as embedded memories. Because all macros have to be connected to a power/ground network, power planning becomes more complex than ever. With the number of macros in a modern SoC increases dramatically, it is ineffective to rely on experienced designers to perform power planning manually.

A need has thus arisen to propose a novel power planning scheme in order to increase overall effectiveness of routing resource.

SUMMARY OF THE INVENTION

In view of the foregoing, it is an object of the embodiment of the present invention to provide a routability-driven macro-aware power planning method and chip that is capable of substantially increasing routability and facilitating connection of macros according to their locations; proposing an effective power stripe width which can substantially increase overall effectiveness of routing resource; and providing a more precise cost function to determine locations of power stripes in a region based on dynamic programming algorithm.

According to one embodiment, a chip includes a substrate, macros and vertical power strip(s). The macros are placed on the substrate, which has a placement region being divided into sub-regions according to locations of the macros. The vertical power stripe(s) are disposed in each said sub-region. At least one VPS is not aligned with the VPSs of an adjacent higher or lower sub-region.

According to another embodiment, a power planning method includes the following steps. (a) A chip is provided with macros placed thereon. (b) A placement region of the chip is divided into sub-regions according to locations of the macros. (c) For each sub-region, a total power routing width (TPRW) of vertical power stripes (VPSs) is determined. (d) A number of the VPSs for each said region is determined by dividing the TPRW with an effective stripe width. (e) Locations of the VPSs are determined for each sub-region.

DETAILED DESCRIPTION OF THE INVENTION

Figure 1:
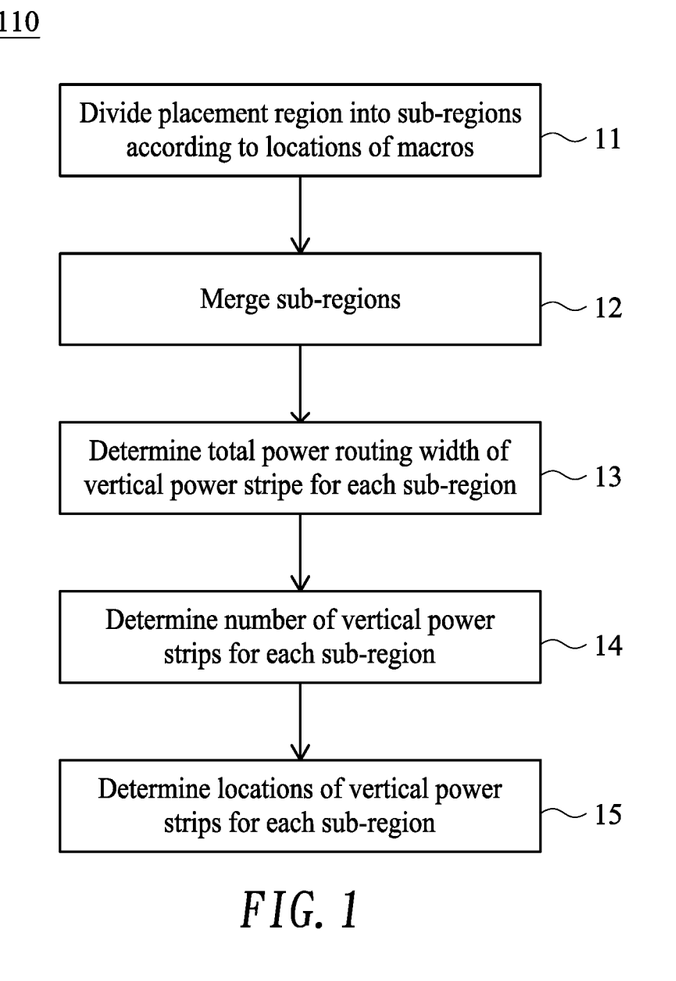
FIG. 1 shows a flow diagram illustrating a routability-driven macro-aware power planning method according to one embodiment of the present invention.

FIG. 1 shows a flow diagram illustrating a routability-driven macro-aware power planning method ("power planning method" hereinafter) 100 according to one embodiment of the present invention.

Figure 2A:
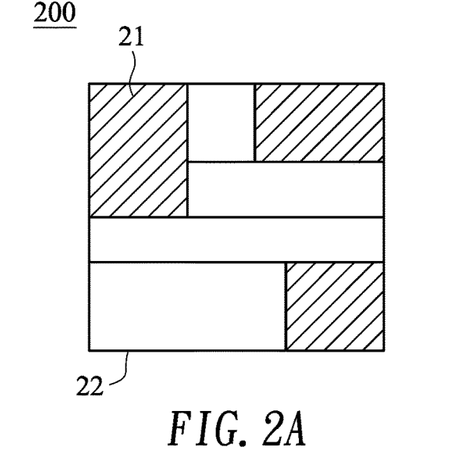
FIG. 2A to FIG. 2E schematically show a top view illustrating a chip having pre-placed macros.

In step 11, a placement region of a chip may be divided into a plurality of sub-regions (SRs) according to locations of macros. In the specification, the term chip (or microchip) refers to an integrated circuit that is composed of electronic circuits such as intellectual property (IP) cores or macros placed on a semiconductor (e.g., silicon) substrate. FIG. 2A schematically shows a top view illustrating a chip 200 having macros 21 (denoted by hatched region) that are placed beforehand (i.e., pre-placed) within a placement region 22.

Specifically, as shown in FIG. 2A, for each macro 21, a first horizontal line overlapping a horizontal power stripe (HPS) nearest (but not necessarily coinciding with) a top edge of the macro 21 is extended until bumping into another macro or a boundary of the placement region 22, and a second horizontal line overlapping a HPS nearest (but not necessarily coinciding with) a bottom edge of the macro 21 is extended until bumping into another macro or the boundary of the placement region 22.

Figure 2B:
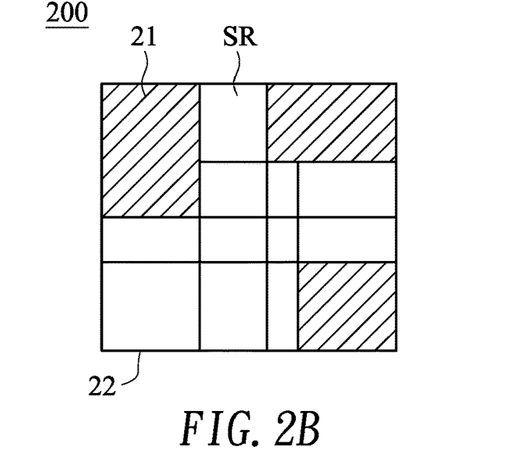

As shown in FIG. 2B, a first vertical line overlapping a left edge of the macro 21 is extended until bumping into another macro or the boundary of the placement region 22, and a second vertical line overlapping a right edge of the macro 21 is extended until bumping into another macro or the boundary of the placement region 22. Accordingly, the first horizontal lines, the second horizontal lines, the first vertical lines and the second vertical lines of the macros 21 divide the placement region 22 of the chip 200 into a plurality of sub-regions SRs. As exemplified in FIG. 2B, solid lines denote edges of, and define, the plurality of sub-regions SRs. Therefore, any pre-placed macro 21 may be surrounded by a ring formed by HPSs and vertical power stripes (VPSs) that will be described later; thus it is able to connect the macro 21 to a power network no matter which pin type the macro 21 has. Besides, according to the embodiment, power planning in each sub-region SR can be performed independently, and flexibility of power planning may thus be substantially increased. In the embodiment, the HPSs are disposed in a first top metal layer, and the VPSs are disposed in a second top metal layer below (and insulated from) the HPSs.

Figure 2C:
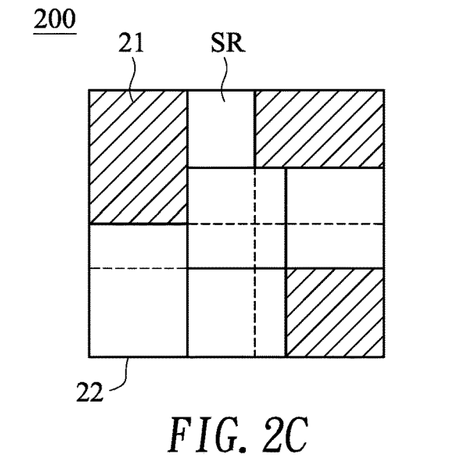

Next, in step 12, at least one sub-region SR may be merged with a neighboring sub-region SR or sub-regions SRs when necessary. FIG. 2C schematically shows a top view illustrating the chip 200 of FIG. 2A where solid lines denote edges of the sub-regions SRs after merging, and dashed lines denote edges of the sub-regions SRs before merging. Accordingly, some sub-regions SRs having small areas (e.g., measured less than a predetermined value) may be merged with the neighboring sub-region SR to form a larger sub-region SR.

In one embedment, a vertical merging is first performed, followed by a horizontal merging. Specifically, every sub-region SR is checked in serial. If a sub-region SR contains less than a predetermined number of (e.g., two) HPSs, the sub-region SR is then merged with a lower sub-region SR if it exists and the two sub-regions SRs have the same width. Otherwise, the sub-region SR is then merged with a higher sub-region SR if it exists and the two sub-regions SRs have the same width. Similarly, if a sub-region SR contains less than a predetermined number of (e.g., five) VPSs, the sub-region SR is then merged with a left sub-region SR if it exists and the two sub-regions SRs have the same height. Otherwise, the sub-region SR is then merged with a right sub-region SR if it exists and the two sub-regions SRs have the same height.

Figure 2D:
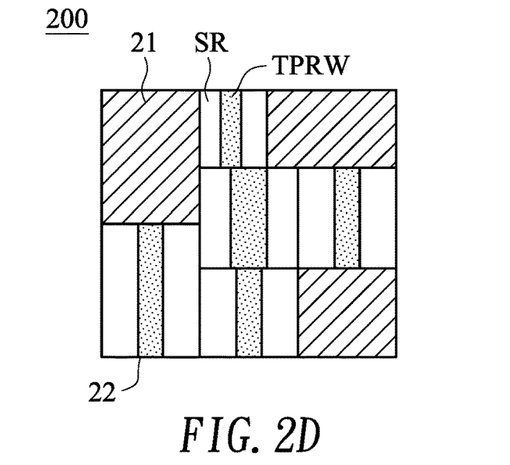

In step 13, for each sub-region SR, a total power routing width (TPRW) of the vertical power stripe (VPS) is determined such that voltage-drop (or IR drop) and electromigration constraints may be satisfied with a minimal routing area. FIG. 2D schematically shows a top view illustrating the chip 200 of FIG. 2A where dotted regions denote the VPSs with the determined total power routing widths (TPRWs) for the sub-regions SRs, respectively. In the embodiment, optimization sizing algorithm proposed by Tan et al. may be adopted to determine the total power routing width (TPRW) of the vertical power stripes (VPSs). It is noted that, in the embodiment, the width of every horizontal power stripe is fixed while the algorithm is applied, and the horizontal power strips are uniformly placed at intervals. Details of the optimization sizing algorithm may be referred to "Reliability-Constrained Area Optimization of VLSI Power/Ground Networks Via Sequence of Linear Programmings," entitled to X.-D. Tan et al., Proceedings of DAC, pp. 78-83, 2003, the disclosure of which is incorporated herein by reference.

Next, in step 14, a number of vertical power stripes (VPSs) for each sub-region SR is determined. In the embodiment, an effective stripe width (ESW) is determined in advance, and the number of VPSs in the sub-region SR is then determined by dividing the total power routing width (TPRW) (as determined in step 13) with the effective stripe width (ESW).

Specifically, according to "Practical Routability-Driven Design Flow for Multilayer Power Networks Using Aluminum-Pad Layer," entitled to W.-H. Chang et al., IEEE TVLSI, vol. 22, no. 5, pp. 1069-1081, June 2013, the disclosure of which is incorporated herein by reference, an irredundant stripe width $w_p$ may be represented as a function of T as follows:

$$w_p(T)=(1+T)\times p-(2\times\Delta(w)+W_{min}) \quad (1)$$

where T is a number of tracks occupied by a power stripe, p is a width of a pitch, $\Delta(w)$ is a minimum spacing between two lines, and $W_{min}$ is a minimum metal width.

Let $w_v$ denotes a width of a via contact, $\Delta_{v2v}$ denotes a shortest distance between two vias, $\Delta_{v2b}$ denotes a shortest distance from a via to a boundary of a covered area. Given a via array $\Delta_{r\times s}$ with dimension of r×s, a width of the covered area may be expressed as follows:

$$w_{A_{r\times s}}=r\times w_v+(r-1)\times\Delta_{v2v}+2\times\Delta_{v2b} \quad (2)$$

Figure 3:
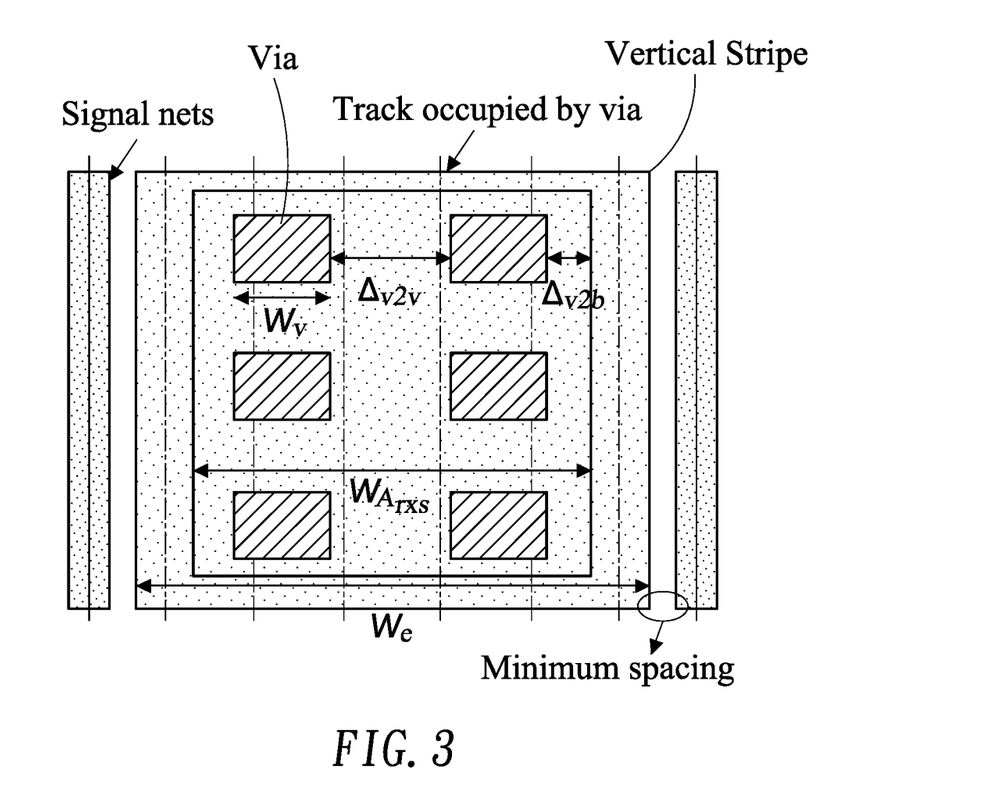
FIG. 3 shows a schematic diagram exemplifying tracks occupied by a via array.

FIG. 3 shows a schematic diagram exemplifying tracks occupied by a via array, which is usually required to connect metals in different layers of a power mesh. The number $T(A_{r\times s})$ of routing tracks occupied by $A_{r\times s}$ may be obtained as follows:

$$T(w_{A_{r\times s}}) = 1 + \left\lceil \frac{w_{A_{r\times s}}}{p} \right\rceil \quad (3)$$

where ∥ denotes a ceiling function that takes an input and gives an output the least integer that is greater than or equal to the input.

Replace (3) into (1), the effective stripe width (ESW) $w_e$ may be expressed as follows:

$$w_e(T(A_{r\times s}))=(1+T(w_{A_{r\times s}}))\times p-(2\times A(w)+W_{min}) \quad (4)$$

As stated above, the number of VPSs in the sub-region SR may then be determined by dividing the total power routing width (TPRW) (determined in step 13) with the effective stripe width (ESW) (as obtained in (4)).

Figure 2E:
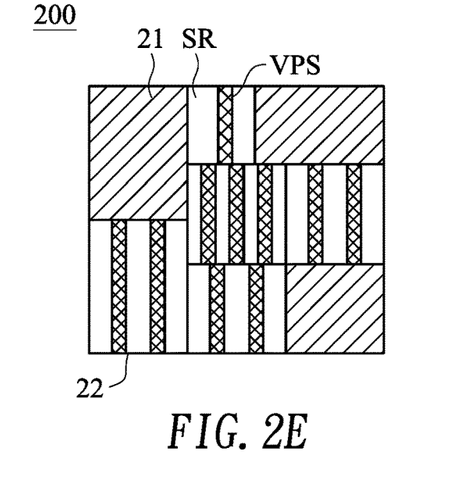

Finally, in step 15, locations of the VPSs for each sub-region SR are determined. FIG. 2E schematically shows a top view illustrating the chip 200 of FIG. 2A where cross-hatched regions denote the determined VPSs for each sub-region SR. In the embodiment, dynamic programming algorithm proposed by Chang et al. as quoted above may be adopted to determine the locations of the VPSs for each sub-region SR. Different from Chang et al. which apply the algorithm in the whole chip, the present embodiment nevertheless applies the algorithm in each sub-region SR, which makes placement of power stripes substantially more flexible than Chang's approach. According to one aspect of the embodiment, the VPSs are non-uniformly disposed (although they may have a same effective stripe width) such that the distances between adjacent VPSs in a sub-region are not necessary the same. Therefore, the sub-regions (or merged sub-regions) in the embodiment are also called irregular regions, while the regions over the macros 21 are called regular regions. Moreover, as each sub-region is individually determined to place the VPSs, according to another aspect of the embodiment, there is at least one VPS that is not aligned with VPSs of an adjacent higher or lower sub-region. In other words, at least one VPS does not continue across a boundary between adjacent sub-regions in a vertical direction.

Figure 4A:
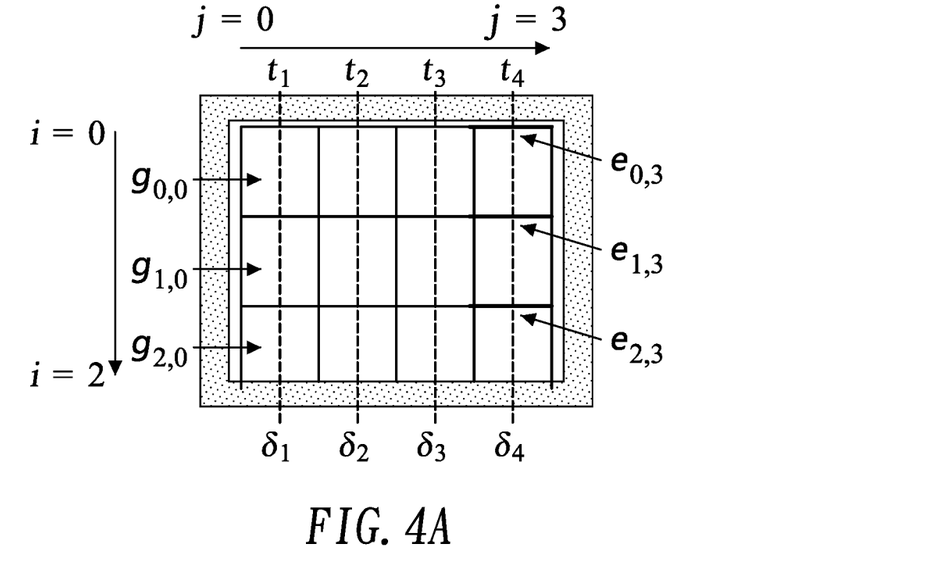
FIG. 4A shows a routing region in a sub-region.

FIG. 4A shows a routing region in a sub-region SR, which is divided into n tiles, where $t_j$ denotes a tile in j column, and each tile has m grids, where $g_{i,j}$ denotes i-th grid in $t_j$. $e_{i,j}$ denotes a top horizontal edge of the grid $g_{i,j}$. $C_{i,j}$ denotes a congestion value of the edge $e_{i,j}$, where $C=d_{i,j}/c_{i,j}$, where $c_{i,j}$ and $d_{i,j}$ respectively denote routing capacity and routing demand (which is based on a number of nets passing through $e_{i,j}$) of the edge $e_{i,j}$. Let $\delta_j$ denote penalty (or congestion cost) for placing a VPS at the tile $t_j$ as follows:

where $$\delta_j = \frac{\sum_{i=1}^{m} \eta \times C_{i,j}}{m}$$

$$\eta = \begin{cases} 1, & C_{i,j} - \overline{C} \leq \sigma \\ 10, & \sigma < C_{i,j} - \overline{C} \leq 2\sigma \\ 100, & 2\sigma < C_{i,j} - \overline{C} \end{cases}$$

and $$\sigma = \sqrt{\frac{\sum_{j=1}^{n}\sum_{i=1}^{m}(C_{i,j} - \overline{C})^2}{n \times m}}$$

where $\overline{C}$ denotes an average of $C_{i,j}$ and $\sigma$ denotes a standard deviation.

Figure 4B:
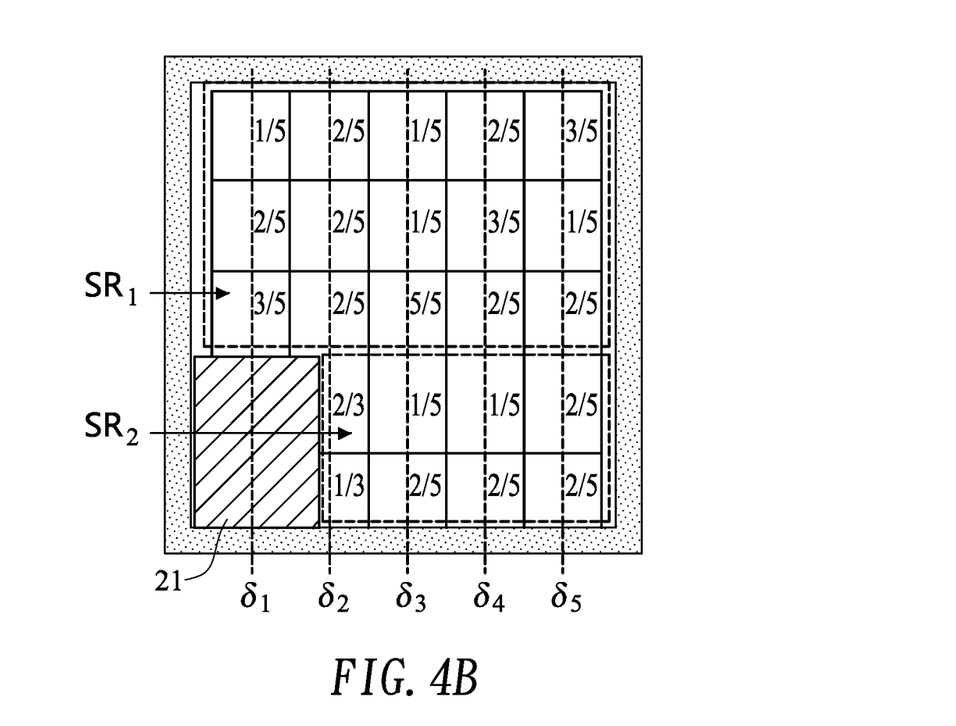
FIG. 4B shows examples of congestion cos in each sub-region.

FIG. 4B shows examples of congestion cost $\delta_j$ in each sub-region $SR_1$ and $SR_2$, based on which VPSs for each sub-region $SR_1$ and $SR_2$ are allocated. For example, for sub-region $SR_1$, $\delta_1=(\frac{1}{3})(100\times(\frac{1}{5})+(\frac{2}{5})+(\frac{3}{5}))=7$, $\delta_2=(\frac{1}{3})((\frac{2}{5})+(\frac{2}{5})+(\frac{2}{5}))=0.4$. For sub-region $SR_2$, $\delta_2=(\frac{1}{2})(100\times(\frac{2}{3})+(\frac{1}{3}))=33.5$.

Figure 5A:
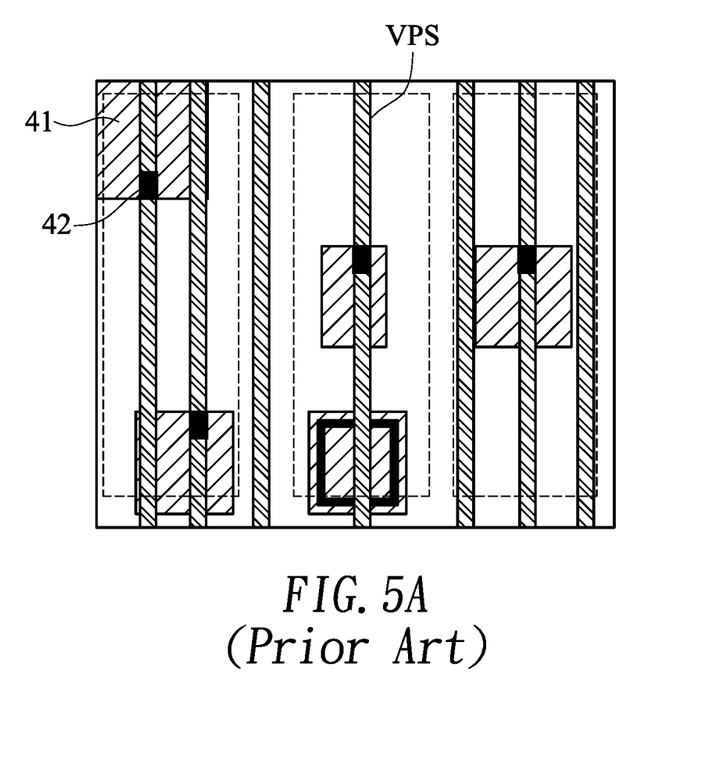
FIG. 5A schematically shows a top view illustrating a traditional design which contains several macros with different pin types.
Figure 5B:
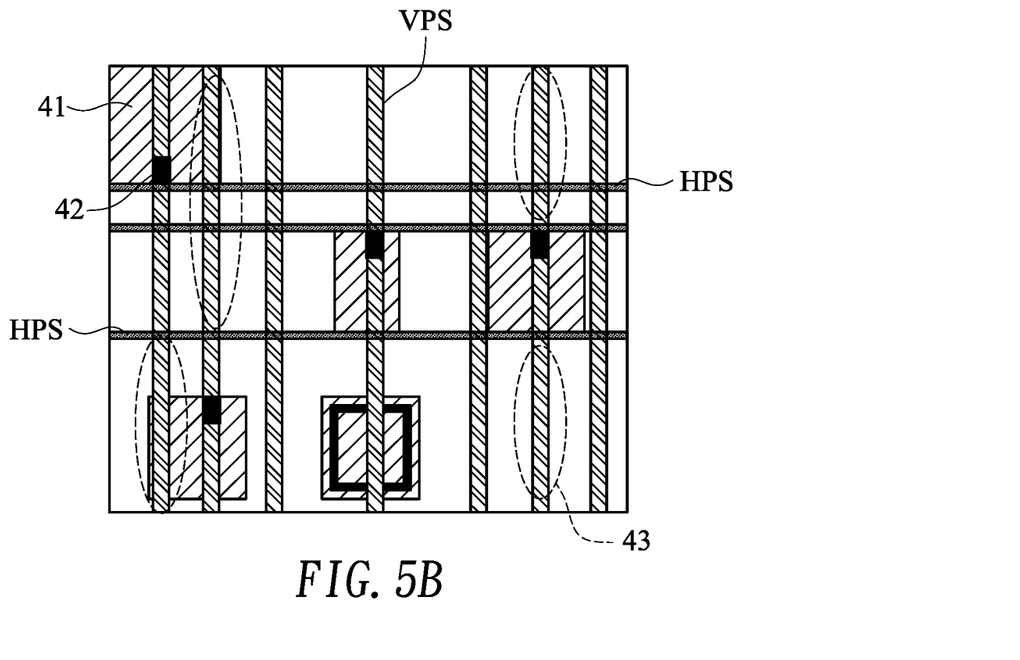
FIG. 5B and FIG. 5C schematically show top views illustrating a design according to the embodiment of the present invention.
Figure 5C:
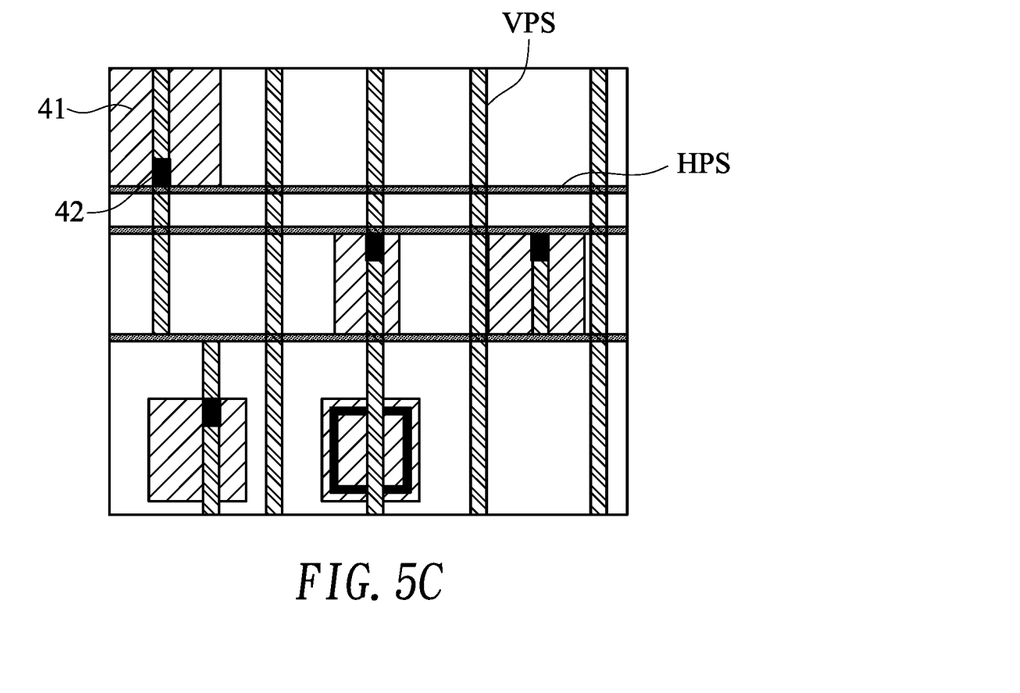

According to the embodiment discussed above, the embodiment proposes a row-based power mesh, which partitions a chip 200 into several sub-regions SRs according to locations of macros 21. The row-based power mesh not only facilitates power/ground connections of macros 21 but also improves routability because of higher flexibility in placing vertical power stripes. Since a traditional power mesh stretches vertical power stripes (VPSs) over the length of a chip, more routing resource may be wasted in order to connect to these macros. FIG. 5A schematically shows a top view illustrating a traditional design which contains several macros 41 with different pin 42 types. It at least has to use 7 VPSs such that all macros 41 can be connected to a power mesh. FIG. 5B and FIG. 5C schematically show top views illustrating a design according to the embodiment of the present invention. Since horizontal power stripes (HPSs) have been distributed at top layers, the embodiment can divide the chip into several rows according to the locations of pre-placed macros 41 as shown in FIG. 5B. Then, the locations of VPSs in each sub-region can be planned independently. Hence, we can complete a power mesh with less number of vertical power stripes (VPSs) as shown in FIG. 5C compared to the redundant (vertical) power stripes 43 shown in FIG. 5B. Moreover, because power stripes in each sub-region can be adjusted independently, it is easier to avoid routing congestion regions compared to that using a longer (vertical) power stripe.

According to the embodiment discussed above, the embodiment also proposes an effective stripe width to determine proper stripe width. Chang et al. as mentioned above propose the irredundant width to determine a stripe width according to the number of routing tracks occupied by the stripe. Based on the concept, the embodiment extends it to consider via arrays while determining a stripe width. Via arrays are usually inserted at overlapped regions between HPSs and VPSs to reduce resistance and increase reliability of a power mesh. There exist several choices in the dimensions of a via array, and a larger dimension will induce less resistance. Because the width of a power stripe is dominated by a via-array, it is necessary to consider the dimension of a via array when the embodiment determines the width a power stripe.

It is noted that the embodiment proposes to perform power planning after placement stage is completed. With information of power consumption and routing congestion at a region, design of a more elaborate power/ground power network becomes possible. The embodiment proposes a precise cost function to determine the penalty (or congestion cost) when we place a power stripe at a location. With the row-based power mesh and a better cost function, the embodiment can easily avoid placing power stripes at routing congestion regions.

Although specific embodiments have been illustrated and described, it will be appreciated by those skilled in the art that various modifications may be made without departing from the scope of the present invention, which is intended to be limited solely by the appended claims.

What is claimed is:

1. A power planning method, comprising:
   (a) providing a chip with a plurality of macros placed thereon;
   (b) dividing a placement region of the chip into a plurality of sub-regions according to locations of the macros;
   (c) determining, for each sub-region, a total power routing width (TPRW) of vertical power stripes (VPSs);
   (d) determining a number of the VPSs for each said region by dividing the TPRW with an effective stripe width; and
   (e) determining locations of the VPSs for each said sub-region;
   wherein the step (b) comprises:
   determining, for each said macro, a first horizontal line overlapping a horizontal power stripe (HPS) nearest a top edge of the macro and being extended until bumping into another macro or a boundary of the placement region;
   determining, for each said macro, a second horizontal line overlapping a HPS nearest a bottom edge of the macro and being extended until bumping into another macro or the boundary of the placement region;
   determining, for each said macro, a first vertical line overlapping a left edge of the macro and being extended until bumping into another macro or the boundary of the placement region; and
   determining, for each said macro, a second vertical line overlapping a right edge of the macro and being extended until bumping into another macro or the boundary of the placement region;
   wherein the first horizontal lines, the second horizontal lines, the first vertical lines and the second vertical lines of the plurality of macros therefore divide the placement region into the plurality of sub-regions.

2. The method of claim 1, wherein the horizontal power stripes (HPSs) are disposed in a first top metal layer, and the VPSs are disposed in a second top metal layer below the HPSs.

3. The method of claim 1, further comprising:
   merging at least one sub-region with a neighboring sub-region or sub-regions before the step (c).

4. The method of claim 3, wherein if the sub-region contains less than a predetermined number of HPSs, the sub-region is then merged with a lower sub-region if it exists and the two sub-regions have a same width, otherwise, the sub-region is then merged with a higher sub-region if it exists and the two sub-regions have a same width.

5. The method of claim 3, wherein if the sub-region contains less than a predetermined number of the VPSs, the sub-region is then merged with a left sub-region if it exists and the two sub-regions have a same height, otherwise, the sub-region is then merged with a right sub-region if it exists and the two sub-regions have a same height.

6. The method of claim 1, wherein in the step (c), the total power routing width (TPRW) is determined such that voltage-drop and electromigration constraints are satisfied with a minimal routing area.

7. The method of claim 1, wherein the VPSs are non-uniformly disposed such that distances between adjacent VPSs in the sub-region are not necessary the same.

8. The method of claim 1, wherein at least one VPS is not aligned with the VPSs of an adjacent higher or lower sub-region.

* * * * *